United States Patent [19]

Weaver et al.

[11] Patent Number: 4,892,923

[45] Date of Patent: Jan. 9, 1990

[54] POLYESTER COMPOSITIONS CONTAINING THE RESIDUE OF A NAPHTHOPYRAN COMPOUND AND SHAPED ARTICLES PRODUCED THEREFROM

[75] Inventors: Max A. Weaver; Wayne P. Pruett, both of Kingsport; Samuel D. Hilbert, Jonesborough; Clarence A. Coates, Jr., Kingsport, all of Tenn.

[73] Assignee: Eastman Kodak Company, Rochester, N.Y.

[21] Appl. No.: 287,819

[22] Filed: Dec. 21, 1988

Related U.S. Application Data

[63] Continuation-in-part of Ser. No. 158,820, Feb. 22, 1988, abandoned.

[51] Int. Cl.$^4$ .................. C08G 63/20; C08G 63/18; C08G 63/16
[52] U.S. Cl. .................. 528/190; 525/411; 528/288; 528/289; 528/290; 528/291; 528/298
[58] Field of Search ............ 528/298, 190, 288, 289, 528/290, 291; 524/110; 525/411

[56] References Cited

U.S. PATENT DOCUMENTS

| | | | |
|---|---|---|---|
| 2,680,746 | 6/1954 | Schappi | 524/110 |
| 2,686,170 | 8/1954 | Best | 524/110 |
| 2,878,138 | 3/1959 | Raue et al. | 549/280 |
| 2,905,570 | 9/1959 | Hawthorne et al. | 427/160 |
| 3,014,041 | 12/1961 | Hausermann et al. | 549/280 |
| 3,075,996 | 1/1963 | Raue | 549/280 |
| 3,106,567 | 10/1963 | Hawthorne et al. | 427/160 |
| 3,200,086 | 8/1965 | Coleman | 525/437 |
| 3,213,058 | 10/1965 | Boyle et al. | 528/73 |
| 3,271,412 | 9/1966 | Raue et al. | 548/250 |
| 4,153,596 | 5/1979 | Oertel et al. | 525/437 |
| 4,233,410 | 11/1980 | Rody et al. | 528/73 |
| 4,305,719 | 12/1981 | Zannucci et al. | 8/662 |
| 4,338,247 | 7/1982 | Zannucci et al. | 528/437 |
| 4,340,718 | 7/1982 | Zannucci et al. | 528/128 |
| 4,347,350 | 8/1982 | Horner et al. | 528/190 |
| 4,617,374 | 10/1986 | Pruett et al. | 528/288 |
| 4,661,566 | 4/1987 | Pruett et al. | 525/455 |
| 4,707,537 | 11/1987 | Pruett et al. | 528/288 |

FOREIGN PATENT DOCUMENTS

| | | |
|---|---|---|
| 51-6964 | 1/1976 | Japan. |
| 56-151751 | 11/1981 | Japan. |
| 701150 | 12/1953 | United Kingdom. |

*Primary Examiner*—Veronica P. Hoke
*Attorney, Agent, or Firm*—J. Frederick Thomsen; William P. Heath, Jr.

[57] ABSTRACT

Disclosed are compositions useful for molding into articles such as food containers, beverage bottles, cured structural plastics and the like comprising a polyester such as a linear, thermo-plastic polyester having reacted or copolymerized therein the residue of a 3H-naphtho[2,1-b]pyran-3-one or 3H-naphtho[2,1-b]pyran-3-imine compound. The naphthopyran compounds and residues are stable at the high temperatures at which the polymers are prepared and absorb radiation in the range of 350 to 450 nm.

8 Claims, No Drawings

POLYESTER COMPOSITIONS CONTAINING THE RESIDUE OF A NAPHTHOPYRAN COMPOUND AND SHAPED ARTICLES PRODUCED THEREFROM

This application is a continuation-in-part of our copending application Ser. No. 158,820 filed Feb. 22, 1988 now abandoned.

This invention pertains to novel polyester compositions in which the polyester polymer has reacted therewith or copolymerized therein the residue of certain naphthopyran compounds. This invention also pertains to fibers and, particularly, to containers, such as those suitable for packaging beverages and foods, manufactured from our novel condensation polymers.

Many products such as certain fruit juices, soft drinks, wines, food products, cosmetics and shampoos are deleteriously affected, i.e., degraded, by ultraviolet (UV) light when packaged in clear plastic containers which pass significant portions of the available light at wavelengths in the range of approximately 250 to 390 nm. Polyesters commonly used in the manufacture of packaging materials such as poly(ethylene terephthalate) typically absorb ultraviolet radiation of wavelengths of up to about 320 nm. Thus, effective UV screening agents should absorb a substantial amount, e.g., up to about 90%, of ultraviolet light up to 390 nm, especially up to about 370 nm. It is particularly important that containers of products which are degraded by UV light, transmit less than 10% of incident light of wavelengths of 370 nm or less.

It is well known the polymers can be rendered resistant to degradation by UV light by physically blending in such polymers various UV light stabilizers such as benzophenones, benzotriazoles and resorcinol monobenzoates. See, for example, Plastics Additives Handbook, Hanser Publishers, Library of Congress, Catalog No. 83-062289, pp 128-134. Normally, such stabilizers are used in a weight concentration of at least 0.5 percent. Although these stabilizers generally function well to absorb radiation in the range of about 300 to 350 nm, absorbance in the range of 350 to 400 nm is not adequate to protect comestibles subject to UV light degradation packaged in clear plastic, i.e., essentially colorless, transparent plastics. Futhermore, many of the known UV absorbers do not possess sufficient thermal stability to permit their incorporation into polymers during the preparation of the latter or to permit high temperature processing of the polymeric materials in which they have been incorporated. The stabilizers present in many of the known stabilized polymer compositions can be extracted from the polymer by solvents such as acids, alcohols and the like present in foods or beverages packaged within the stabilized polymers. Furthermore, many compounds used to stabilize polymers are not stable at high temperatures and decompose under the conditions at which polyesters are manufactured or processed. Decomposition of such stabilizers frequently causes yellow discoloration of the polymer and results in the polymer containing little, if any, of the stabilizer.

The novel polyester compositions provided by our invention comprise molding or fiber grade polyester polymer having reacted therewith or copolymerized therein the residue of certain 3H-naphtho[2,1-b]pyran-3-one or 3H-naphtho[2,1-b]pyran-3-imine compound. The above described naphthopyran compounds and residues possess excellent thermal stability and exhibit strong ultraviolet and/or visible light absorbance over the spectral range of about 350 nm to 450 nm. The compounds which absorb light in the visible spectrum have high extinction coefficients and impart to the condensation polymer stable yellow shades. Thus, the visible light-absorbing naphthopyran compounds can be used in conjunction with red and blue colorants to produce condensation polymer having a variety of colors such as green and amber. The naphthopyran compounds also impart to the polymers the advantageous property of fluorescence.

The residue of 3H-naphtho[2,1-b]pyran-3-one compounds or 3H-naphtho[2,1-b]pyran-3-imine compounds are derived from naphthopyrans which bear at least one group or substituent that is reactive with one of the monomers from which the polyester polymer is derived. The reactivity of the naphthopyran compound resulting from the presence thereon of one or more reactive substituents also enables the compounds to react with a prepolymer or polymer derived from the monomers. The precursors of the residues having one reactive group react at the terminal of the polymer chain and thus function as chain terminating agents. When the precursor compounds contain two reactive groups, the compounds function as monomers, and thus are copolymerized within the polymer chain.

Examples of the requisite reactive groups include carbonyl halides such as carbonyl chloride, carboxy, alkoxycarbonyl, alkenyloxycarbonyl, cycloalkoxycarbonyl, aryloxycarbonyl, amino, hydroxy, esterified hydroxy, i.e., acyloxy, groups such as carboxylic acid esters, e.g., alkanoyloxy, cycloalkanoyloxy and aroyloxy, carbamic acid esters, e.g., N-alkylcarbamoyloxy and N-arylcarbamoyloxy and carbonate esters, e.g., ethoxycarbonyloxy.

The amount of the naphthopyran compound or residue present in the condensation polymer compositions typically may be in the range of about 10 to 100,000 ppm by weight per million parts by weight polymer. The polymer compositions may have incorporated therein one or a plurality of the naphthopyran compounds specified hereinabove or residues derived therefrom.

The naphthopyran compounds useful in preparing the novel polyester compositions provided by this invention have the formula

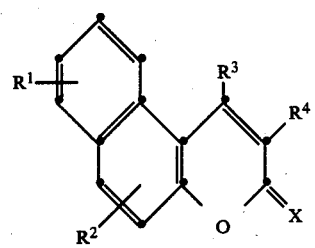

(I)

wherein $R^1$ and $R^2$ are independently selected from hydrogen, $-R^5$, hydroxy, $-O-R^5$, halogen,

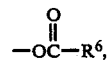

amino or

$R^3$ is hydrogen or an unsubstituted or substituted alkyl or aryl radical;

$R^4$ is cyano,

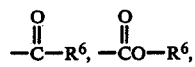

carbamoyl,

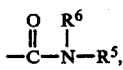

—$SO_2$—$R^5$, or an unsubstituted or substituted carbocyclic or heterocyclic aryl radical; and X is oxo or imino;

wherein $R^5$ is alkenyl or an unsubstituted or substituted alkyl, cycloalkyl or aryl radical;

$R^6$ is hydrogen or an unsubstituted or substituted alkyl, cycloalkyl or aryl radical; and

collectively are a group having the structure

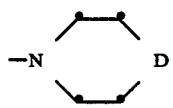

wherein D is —$CH_2$—, —O—, —S—, —$SO_2$—, —N($R^5$)—,

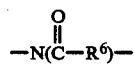

or —N($SO_2$—$R^6$)—; provided the naphthopyran compound bears at least one substituent that is reactive with one of the monomers from which the polyester polymer is derived, said naphthopyran residue absorbing radiation in the range of about 350 to 450 nm and being non-extractable from said polymer and stable under the polymer processing conditions.

The alkyl radicals represented by $R^5$ and $R^6$ can be unsubstituted or substituted alkyl of up to about 12 carbon atoms, preferably up to about 8 carbon atoms. Examples of the unsubstituted alkyl radicals include methyl, ethyl, propyl, butyl, isobutyl, pentyl, hexyl, octyl, 2-ethylhexyl, decyl, dodecyl, and isomers thereof. Examples of the substituents which may be present on the substituted alkyl radicals include hydroxy, alkoxy, hydroxyalkoxy, alkylthio, hydroxyalkylthio, halogen such as chloro or bromo; cyano; carboxylic acyloxy, e.g., groups having the formula

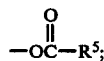

alkylsulfonyl; cycloalkylsulfonyl; arylsulfonyl; vinylsulfonyl; carboxylic acylamido, e.g., groups having the formula

acrylamido; sulfonic acylamido, e.g., groups having the formula —N($R^6$)$SO_2$—$R^5$; alkoxycarbonyl; cycloalkoxycarbonyl; aryloxycarbonyl; alkoxycarbonylamino; cycloalkoxycarbonylamino; aryloxycarbonylamino; carboxy; carbamoyl; N-substituted carbamoyl, e.g., groups having the formula

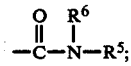

sulfamoyl; N-substituted sulfamoyl, e.g., groups having the formula

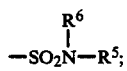

carbamic acid acyloxy, e.g., groups having the formula

and alkoxycarbonyloxy. The alkyl radicals also may be substituted with aryl, alkoxycarbonylaryl, chlorocarbonylaryl, N-(hydroxyalkyl)carbamoylaryl, N-(hydroxyalkyl)sulfamoylaryl, aryloxy, alkoxycarbonylaryloxy, arylthio, cycloalkyl, cycloalkoxy and cycloalkylthio wherein the aryl and cycloalkyl radicals are defined hereinbelow. Additional examples of the substituents which may be present on the alkyl radicals represented by $R^5$ and $R^6$ are imide groups having the formula

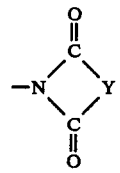

wherein Y represents the residue of a dicarboxylic acid such as, for example, ethylene; ethylene substituted with hydroxy, alkoxy, alkanoyloxy or halogen, 1,3-propanediyl, 1,2-cyclohexylene, 1,2-tetrahydrophenylene, 1,2-phenylene, or 1,2-phenylene substituted with carboxyl, alkyl, alkoxy, or halogen. Y also may represent —NH—$CH_2$—, —N(alkyl)—$CH_2$—, —O—$CH_2$—, —S—$CH_2$—, or —$CH_2$—O—$CH_2$—. Alkyl radicals $R^5$ and $R^6$ also may be substituted with 2-pyrrolididono or groups having the structure

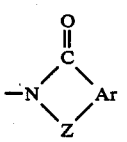

wherein Ar is an o-arylene radical, e.g., unsubstituted or substituted o-phenylene and Z is —CH$_2$— or —SO$_2$—.

The substituents which may be present on the substituted alkyl groups also include heterocyclic thio groups, e.g., groups having the formula —S—Het wherein Het is a heterocyclic aryl radical such as unsubstituted and substituted pyridyl, pyrimidinyl, pyrolyl, quinolyl, thienyl, furanyl, benzoxazolyl, benzimidazolyl, benzothiazolyl, 1,3,4-thiadiazol-2-yl, 1,2,4-thiadiazol-3-yl, or triazolyl.

The cycloalkyl radicals represented by R$^5$ and R$^6$ may be unsubstituted or substituted cycloalkyl having from 5 to 7 nuclear carbon atoms. The aryl radicals represented by R$^5$ and R$^6$ may be unsubstituted or substituted carbocyclic aryl having from 6 to 10 carbon atoms. Examples of the substituents present on the substituted aryl radicals include alkyl and the substituents which can be present on the substituted alkyl radicals represented by R$^5$.

Examples of the various substituents which may be present on the naphthopyran compounds, i.e., the substituents represented by R$^1$, R$^2$, R$^3$ and R$^4$ are included in the above definition of R$^5$ and R$^6$. The various alkyl groups and alkyl moiety-containing groups included in the definitions of R$^1$, R$^2$, R$^3$ and R$^4$ can contain up to about 12 carbon atoms, preferably up to about 8 carbon atoms.

The naphthopyran compounds defined hereinabove bear or contain at least one substituent that is reactive with one of the monomers from which the polyester polymer is derived. Examples of such reactive substituents include carbonyl halides such as carbonyl chloride, carboxy, alkoxycarbonyl, alkenyloxycarbonyl, cycloalkoxycarbonyl, aryloxycarbonyl, amino, hydroxy, esterified hydroxy, i.e., acyloxy, groups such as carboxylic acid esters, e.g., alkanoyloxy, cycloalkanoyloxy and aroyloxy, carbamic acid esters, e.g., N-alkylcarbamoyloxy and N-arylcarbamoyloxy and carbonate esters, e.g., ethoxycarbonyloxy. The naphthopyran residue may be incorporated into or on the polymer chain by reacting one or more naphthopyran compounds of formula (I) with the monomers, with a prepolymer or with the final polymer. As those skilled in the art will appreciate, when the reactive substituent or substituents are alkoxycarbonyl, alkenyloxycarbonyl, cycloalkoxycarbonyl, aryloxycarbonyl, or acyloxy, the alkyl, alkenyl, cycloalkyl and aryl residues and the acid residues of the acyloxy substituents are displaced or removed from the naphthopyran compound upon reaction with the polymer or polymer precursor. Thus, those residues are not important to the naphthopyran residue component of our novel compositions.

The preferred reactive naphthopyran compounds have the formula

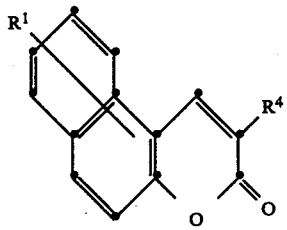

wherein
R$^1$ is hydrogen, hydroxy, hydroxyalkoxy, alkanoyloxyalkoxy, alkoxycarbonylalkoxy, alkoxycarbonylphenylalkoxy, N,N-bis(hydroxyalkyl)amino, N-alkyl-N-alkanoyloxyalkylamino, N-aryl-N-alkanoyloxyalkylamino, N-alkyl-N-hydroxyalkylamino, N-aryl-N-hydroxyalkylamino, N,N-bis(alkanoyloxyalkyl)amino, N-alkyl-N-carboxyalkylamino, N,N-bis(carboxylalkyl)amino, N-alkyl-N-alkoxycarbonylalkylamino, N,N-bis(alkoxycarbonylalkyl)amino, N-alkyl-N-alkoxycarbonylbenzylamino, N,N-bis(alkoxycarbonylbenzyl)amino, N-alkyl-N-carboxybenzylamino or N,N-bis(carboxybenzyl)amino; and R$^4$ is alkoxycarbonyl, arylsulfonyl, cyano, 2-benzoxazolyl, carboxy-2-benzoxazolyl, alkoxycarbonyl-2-benzoxazolyl, 2-benzothiazolyl, carboxy-2-benzothiazolyl, alkoxycarbonyl-2-benzothiazolyl, 2-benzimidazolyl, carboxy-2-benzimidazolyl or alkoxycarbonyl-2-benzimidazolyl;

wherein each alkyl group and alkyl moiety contains up to 6 carbon atoms and each aryl group is phenyl or phenyl substituted with alkyl of up to 4 carbon atoms or halogen and R$^1$ and/or R$^4$ is a reactive substituent.

The naphthopryan compounds of formula (I) can be prepared according to published procedures or variations thereof which are readily apparent to those skilled in the art. For example, unsubstituted or substituted 2-hydroxy-1-naphthaldehydes (II) may be reacted with active methylene compounds (III) or (IV) under Knoevenagel reaction conditions using basic catalysts to give compounds of formula (I) wherein R$^3$ is hydrogen.

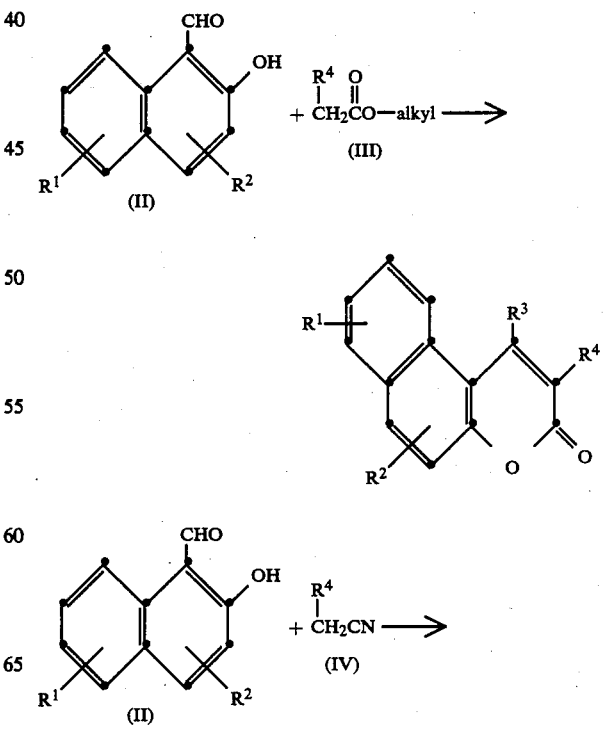

-continued

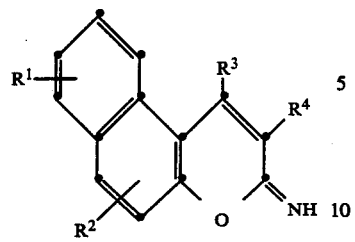

Examples of the basic catalysts which may be used include piperidine, piperidine acetate, pyridine, pyrrolidine and sodium acetate. The reaction is carried out in the presence of an inert solvent such as methanol, ethanol and 2-propanol. When using an active methylene compound of relatively low reactivity, completion of the reaction may require the use of other solvents such as benzene or toluene which permit the water of reaction to be removed azeotropically. Certain of the compounds of formula (I) can be prepared from 2-hydroxy-1-naphthaldehydes by the Perkin reaction (Johnson, Organic Reactions, John Wiley and Sons, New York, 1942, Vol. 1, p. 210).

The naphthopyran compounds wherein X is oxygen also can be prepared by the Peckman reaction (*The Peckman Reaction*, S. Sethna and R. Phadke, Organic Reactions, 1953, Vol. 7, p. 1) wherein optionally substituted 2-naphthols are condensed with malic acid or a β-keto ester in the presence of condensing agents such as sulfuric acid. The Peckman procedure is particularly suitable for the preparation of naphthopyran compounds (I) wherein $R^3$ is alkyl, alkoxycarbonylmethyl, or unsubstituted or substituted aryl.

Some of the intermediate aldehydes (II) from which the naphthopyrans of formula (I) may be prepared are described in the following references: 2-hydroxy-1-naphthaldehyde (Org. Syn. Collective Vol. III, p. 463), 2,6-dihydroxy-1-naphthaldehyde (R. Robinson and F. Weygand, J. Chem. Soc., 1961, p. 389, 2,3-dihydroxy-1-naphthaldehyde [F. D. Cramer and H. Windel, Chem. Ber. 89, 354–65 (1956); C.A. 50:13894i], 2,4-dihydroxy-1-naphthaldehyde [H. Teuber and G. Steinmetz, Chem. Ber., 98(3) 666–84 (1965); C.A. 62:14592d], 2,7-dihydroxy-1-naphthaldehyde (C. Schiele, et al., Tetrahedron 24 (5), 2293–6 (1968); C.A. 68:78012d]. Ring closure to 3H-naphtho[2,1-b]pyran-3-ones can be accomplished by procedures disclosed in the following literature:

(a) U.S. Pat. No. 3,271,412;
(b) F. D. Cramer and H. Windel, Chem. Ber. 89, 354–65 (1956; C.A. :50:13894i);
(c) M. Baltorowicz, Pr. Inst. Przem. Org. 1970, 2, 33–43; C.A. 78:58190p);
(d) A. P. Kuriakose and S. Sethna, J. Indian Chem. Soc. 1972, 49 (11), 1155–9 (C.A. 76:136133p), and
(e) "The Peckman Reaction," S. Sethna and R. Phadke, Organic Reactions, 1953, Vol. 7, p. 1.

The polyesters which may be used in the preparation of the compositions of our invention include linear, thermoplastic, crystalline or amorphous polyesters produced by conventional polymerization techniques from one or more diols and one or more dicarboxylic acids. The polyesters normally are molding or fiber grade and have an inherent viscosity (I.V.) of about 0.4 to about 1.2. The preferred polyesters comprise at least about 50 mole percent terephthalic acid residues and at least about 50 mole percent ethylene glycol and/or 1,4-cyclohexanedimethanol residues. Particularly preferred polyesters are those containing from about 75 to 100 mole percent terephthalic acid residues and from about 75 to 100 mole percent ethylene glycol residues.

The diol components of the described polyesters may be selected from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)-tricyclo-[5.2.1.0]-decane wherein X represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

The acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalene-dicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

The linear polyesters may be prepared according to procedures well known in the art. For example, a mixture of one or more dicarboxylic acids, preferably aromatic dicarboxylic acids, or ester forming derivatives thereof, and one or more diols may be heated in the presence of esterification and/or poly-esterification catalysts at temperatures in the range of 150° to 300° C. and pressures of atmospheric to 0.2 mm Hg. Normally, the dicarboxylic acid or derivative thereof is esterified or transesterified with the diol(s) at atmospheric pressure and at a temperature at the lower end of the specified range. Polycondensation then is effected by increasing the temperature and lowering the pressure while excess diol is removed from the mixture.

The novel polymer compositions provided by this invention are useful in the manufacture of containers or packages for comestibles such as beverages and food. By the use of known heat-setting techniques, certain of the polyesters are, in terms of color, I.V. and heat distortion, stable at temperatures up to about 100° C. Such stability characteristics are referred to herein as "hot-fill" stability. Articles molded from these polyesters exhibit good thin-wall rigidity, excellent clarity and good barrier properties with respect to moisture and atmospheric gases, particularly carbon dioxide and oxygen.

The linear polyesters most preferred for use in articles having "hot-fill" stability comprise poly(ethylene terephthalate), poly(ethylene terephthalate) wherein up to 5 mole percent of the ethylene glycol residues have been replaced with residues derived from 1,4-cyclohexanedimethanol and poly(ethylene 2,6-naphthalenedicarboxylate), wherein the polyesters have been sufficiently heat set and oriented by methods well known in the art to give a desired degree of crystallinity. By definition, a polymer is "hot-fill" stable at a prescribed temperature when less than 2% change in volume of a container manufactured therefrom occurs upon filling the same with a liquid at the temperature. For the manufacture of blow-molded beverage bottles, the preferred poly(ethylene terephthalate) and 1,4-cyclohexanedimethanol-modified poly(ethylene terephthalate polyesters have an I.V. of 0.65 to 0.85, and a Tg of >70° C., and film sections cut from the bottle have a Water Vapor Transmission Rate of 1.5 to 2.5 g mils/100 in.$^2$-24 hours, a Carbon Dioxide Permeability of 20 to 30 cc. mils/100 in.$^2$-24 hours-atm., and an Oxygen Permeability of 4 to 8 cc. mils/100 in.$^2$-24 hours-atm. The Tg is determined by Differential Scanning Calorimetry at a scan rate of 20 Centigrade Degrees/min., the Oxygen Permeability by the standard operating procedure of a MOCON OXTRAN 100 instrument of Modern Controls, Inc., of Elk River, Minnesota, and the Carbon Dioxide Permeability by the standard operating procedure of a MOCON PERMATRAN C II, also of Modern Controls.

The concentration of the naphthopyran residue in the condensation polymer can be varied substantially depending, for example, on the intended function of the UV and/or visible light absorbing compound or residue and/or the end use for which the polymer composition is intended. When the polymer composition is to be used in the fabrication of relatively thin-walled containers to screen UV light in the range of about 250 to 390 nm, the concentration of the naphthopyran compound or residue normally will be in the range of about 50 to 1500 ppm (parts by weight per million parts by weight polymer) with the range of about 200 to 800 ppm being especially preferred.

Polymer compositions containing substantially higher amounts, e.g., from about 2.0 to 10.0 weight percent, of one or more of the naphthopyran residues described herein may be used as polymer concentrates. Such concentrates may be blended with the same or different polymer according to conventional procedures to obtain polymer compositions which will contain a predetermined amount of the residue or residues in a nonextractable form. In the preparation of these highly loaded, polymer composition concentrates the residue preferably is divalent and thus is derived from a difunctional naphthopyran compound such as the compound of Example 6.

The preparation of the naphthopyran compounds and their use in preparing the compositions of our invention are further illustrated by the following examples:

EXAMPLE 1

A mixture of 2-hydroxy-1-naphthaldehyde (1.72 g, 0.01 mol), diethyl malonate (1.60 g, 0.01 mol), ethanol (20 mL), piperidine (10 drops) and acetic acid (5 drops) is heated at reflux for 4 hours. After cooling, the reaction mixture is filtered. The product is washed with alcohol and dried in air (yield 1.65 g, 61.6% of the theoretical yield). Mass spectroscopy analysis indicates the product is ethyl 3-oxo-3H-naphtho[2,1-b]pyran-2-carboxylate having the structure

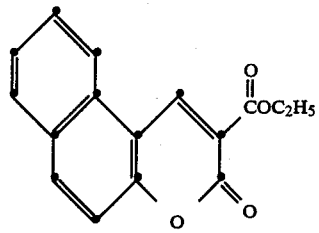

It exhibits a maximum absorption (λ max) at 374 nm in methylene chloride and has a strong blue-white fluorescence under UV light.

EXAMPLE 2

A mixture of 2-hydroxy-1-naphthaldehyde (1.72 g, 0.01 mol), 2-ethoxycarbonylmethyl-5-carboxybenzoxazole (2.49 g, 0.01 mol), ethanol (30 mL), piperidine (10 drops), and acetic acid (5 drops) is heated at reflux for 3 hours. After cooling the reaction mixture is filtered to isolate the yellow fluorescent product which is then washed with ethanol and dried in air to yield 2.0 g (56% of theory) of 2-(5-carboxy-2-benzoxazolyl)-3H-naphtho[2,1-b]pyran-3-one having the structure

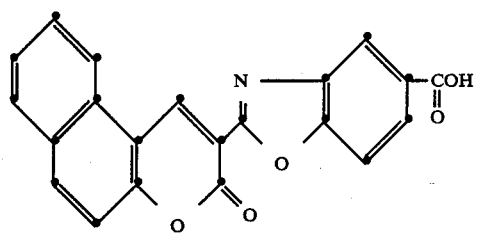

This compound has λ max at 396 nm in the UV-visible spectrum in dimethylformamide.

EXAMPLE 3

A mixture of 2-hydroxy-1-naphthaldehyde (1.72 g, 0.01 mol), 2-(ethoxycarbonylmethyl)-5-methoxycarbonylbenzoxazole (2.63 g, 0.01 mol), methanol (30 mL), piperidine (10 drops) and acetic acid (5 drops) is heated at reflux for 2 hours. A yellow product crystallizes and is collected by filtration, washed with methanol and dried in air. The yield of 2-(5-methoxycarbonyl-2-benzoxazolyl)-3H-naphtho-[2,1-b]pyran-3-one (supported by mass spectroscopy analysis) is 3.20 g, 86% of theory. The product exhibits an absorption maximum at 396 nm in N,N-dimethylformamide.

Tables I and II describe additional benzopyran compounds which may be used in the preparation of the novel polymer compositions provided by our invention. These compounds may be prepared according to the procedures described in the preceeding examples or techniques analogous thereto. The compounds conform in structures to the generic formulas given for each table.

TABLE I

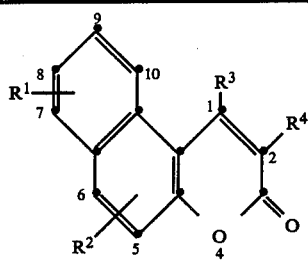

| Example | R¹, R² | R³ | R⁴ |
|---|---|---|---|
| 4 | 6-OH | H | —COOCH$_3$ |
| 5 | 6-OC$_2$H$_5$ | H | —COOCH$_2$CH$_2$OH |
| 6 | 6-OCH$_2$CH$_2$OH | H | —COOCH$_2$CH$_2$OH |
| 7 | 5-OH | H | —CONHCH$_2$CH$_2$OH |
| 8 | 5-OCH$_2$CH$_2$COOC$_2$H$_5$ | H | —SO$_2$CH$_3$ |
| 9 | 7-OH | H | —COO(CH$_2$)$_4$H |
| 10 | 7-OCH$_2$CH$_2$OH | H | —CONHC$_6$H$_5$ |
| 11 | 7-OCH$_2$CH$_2$OOCCH$_3$ | H | —COOCH$_2$C$_6$H$_5$ |
| 12 | 7-OCH$_2$CH$_2$COOC$_2$H$_5$ | H | —COOC$_2$H$_5$ |
| 13 | 7-OCH$_2$C$_6$H$_4$—4-COOCH$_3$ | H | —C$_6$H—4-COOCH$_3$ |
| 14 | 7-OC$_6$H$_4$—4-COOH | H | —COOH |
| 15 | 7-O(CH$_2$)$_3$H | H | —SO$_2$C$_6$H$_5$ |
| 16 | 7-O(CH$_2$)$_4$H | H | —SO$_2$C$_6$H$_4$—4-CH$_3$ |
| 17 | 8-OH | H | —COOCH$_3$ |
| 18 | 8-O(CH$_2$)$_3$OH | H | —COO(CH$_2$)$_3$OH |
| 19 | 8-CH$_2$CH(CH$_3$)$_2$ | H | —COOCH$_2$CH(CH$_3$)$_2$ |
| 20 | 9-OH | H | —COOC$_6$H$_5$ |
| 21 | 9-OCH$_2$C$_6$H$_5$ | H | —COOCH$_2$C$_6$H$_5$ |
| 22 | 9-OCH$_2$CH$_2$OOCOC$_2$H$_5$ | H | —COOCH$_2$CH$_2$Cl |
| 23 | 9-OCH$_2$CH$_2$OOCNHC$_6$H$_5$ | H | —COOCH$_2$CH$_2$CN |
| 24 | 9-OCH$_2$CH$_2$OOCN(CH$_3$)$_2$ | H | —COOCH$_2$CH$_2$C$_6$H$_5$ |
| 25 | 6,8-di-CH$_3$ | H | —COOC$_2$H$_5$ |
| 26 | 8-C$_6$H$_{10}$—4-C$_2$H$_5$ | H | —COOCH$_2$CH$_2$OOCCH$_3$ |
| 27 | 5-CH(CH$_3$)$_2$ | H | —C=N—o-C$_6$H$_3$—5-(COOCH$_3$)—O |
| 28 | 8-C$_6$H$_5$ | H | —C=N—o-C$_6$H$_3$—5-(COOCH$_3$)—S |
| 29 | 8-Cl | H | —C=NN=C(COOH)—O |
| 30 | 7-Br | H | —C=NN=C(C$_6$H$_4$—p-COOH)—S |
| 31 | 8-CH$_2$CH$_2$OH | H | —CN |
| 32 | 8-CH$_2$CH(OH)CH$_2$OH | H | —COC$_6$H$_5$ |
| 33 | 8-OCH$_2$CH(OH)CH$_3$ | H | —COC(CH$_3$)$_3$ |
| 34 | 8-OCH$_2$CH=CH$_2$ | H | —COOCH$_2$CH=CH$_2$ |
| 35 | 8-OC$_6$H$_{11}$ | H | —COOC$_6$H$_{11}$ |
| 36 | 8-OH | H | —COOCH$_2$C$_6$H$_{10}$—4-CH$_2$OH |
| 37 | 8-OCH$_3$ | —CH$_3$ | —COOC$_2$H$_5$ |
| 38 | 8-OC$_2$H$_5$ | —C$_6$H$_5$ | —COOH |
| 39 | 6-CH$_3$ | —CH$_2$COOH | —CONH$_2$ |
| 40 | 6-OCH$_3$ | —CH$_2$COOCH$_3$ | —CN |
| 41 | 6-N(CH$_3$)$_2$ | H | —COOCH$_3$ |
| 42 | 6-N(C$_2$H$_5$)C$_6$H$_5$ | H | —CONHCH$_2$C$_6$H$_{10}$—4-CH$_2$OH |
| 43 | 6-N(CH$_3$)CH$_2$CH$_2$OH | H | —C$_6$H—4-CN |
| 44 | 6-N(C$_6$H$_5$)$_2$ | H | —C$_6$H$_4$—4-COOCH$_3$ |
| 45 | 6-N(CH$_2$CH$_2$OH)$_2$ | H | —C=N—o-C$_6$H$_4$—O |
| 46 | 6-N(CH$_2$CH$_2$OH)$_2$ | H | —CN |
| 47 | 6-N(CH$_2$CH$_2$OOCC$_2$H$_5$)$_2$ | H | —C=N—o-C$_6$H$_4$—NCH$_3$ |
| 48 | 6-N(CH$_2$CH$_2$OOCNHC$_6$H$_5$)$_2$ | H | —C=N—o-C$_6$H$_4$—C(O)NCH$_3$ |

TABLE I-continued

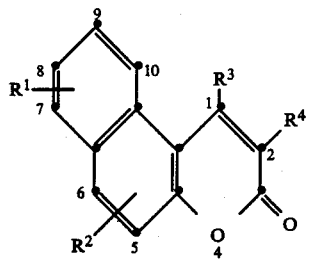

| Example | R¹, R² | R³ | R⁴ |
|---|---|---|---|
| 49 | 6-N(CH₂CH₂OC₂H₅)₂ | H | —COOC₂H₅ |
| 50 | 6-N(CH₂CH₂COOC₂H₅)₂ | H | —C=NCH=CHCH=N (ring) |
| 51 | 6-N(CH₂C₆H₄—4-COOCH₃)₂ | H | —C=CN=CHCH=C (ring) |
| 52 | 6-N(CH₂C₆H₄—4-COOCH₃)₂ | H | —C=CHCH=CHO (ring) |
| 53 | 6-N(C₂H₅)CH₂CH₂CN | H | —C=CHCH=C(COOCH₃)S (ring) |
| 54 | 6-N(CH₂CH₂OOCCH₃)CH₂CH₂NCOCH₂CH₂CO (ring) | H | —C=CH—o-C₆H₄—N=CH (ring) |
| 55 | 6-N(CH₂CH₂OOCCH₃)₂ | H | —C=NNHCH=N (ring) |

TABLE II

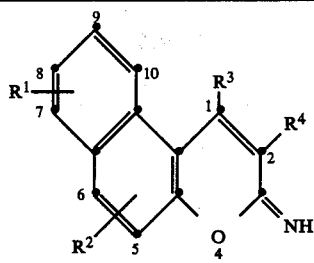

| Example | R¹, R² | R³ | R⁴ |
|---|---|---|---|
| 56 | 6-NCH₂CH₂OCH₂CH₂ (ring) | H | —COOCH₃ |
| 57 | 6-NCH₂CH₂SO₂CH₂CH₂ (ring) | H | —C₆H₄—4-COOCH₃ |
| 58 | 6-N(C₆H₁₁)C₂H₅ | H | —C=N—o-C₆H₄—5-(COOCH₃)—O (ring) |
| 59 | 6-N(C₂H₅)CH₂CH₂CONH₂ | H | —C=N—o-C₆H₄—NCH₂CH₂OH (ring) |
| 60 | 6-N(CH₂CH₂COOC₂H₅)₂ | H | —2-C₁₀H₇ |
| 61 | 6-N(CH₂CH₂COOH)₂ | H | —C=CHCH=CHNH (ring) |
| 62 | 6-N(CH₃)₂ | H | —C₆H₄—4-N(CH₂CH₂OH)₂ |
| 63 | 6-OCH₃ | H | —C₆H₄—3-SO₂N(CH₂CH₂OH)₂ |

TABLE II-continued

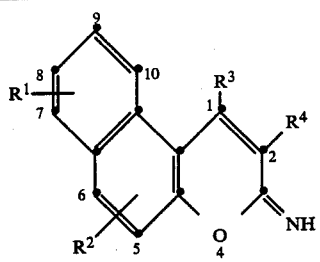

| Example | R¹, R² | R³ | R⁴ |
|---|---|---|---|
| 64 | 6-OOCCH₃ | H | —SO₂C₆H₄—3-COOCH₃ |
| 65 | 6-OOCOC₂H₅ | H | —SO₂C₆H₃—3,4-di-Cl |
| 66 | 6-OCH₂C₆H₄—4-CON(CH₂CH₂OH)₂ | H | —CN |
| 67 | 8-OCH₂C₆H₄—3-SO₂NHCH₂CH₂OH | H | —COC₆H₅ |

EXAMPLE 68

The following materials are placed in a 500-mL, three-necked, round-bottom flask:
- 97 g (0.5 mol) dimethyl terephthalate
- 62 g (1.0 mol) ethylene glycol
- 0.00192 g Ti from a n-butanol solution of acetyl-triisopropyl titanate
- 0.0053 g Mn from an ethylene glycol solution of manganese acetate
- 0.0345 g Antimony trioxide
- 0.0072 g Co from an ethylene glycol solution of cobaltous acetate The flask is equipped with a nitrogen inlet, stirrer, vacuum outlet, and condensing flask. The flask and contents are heated at 200° C. in a Belmont metal bath for 60 minutes and at 210° C. for 75 minutes with a nitrogen sweep over the reaction mixture. Then 1.57 mL of an ethylene glycol slurry of a mixed phosphorus ester composition (Zonyl A) which contains 0.012 g phosphorus is added. The temperature of the bath is increased to 230° C. At 230° C. ethyl 3-oxo-3H-naphtho[2,1-b]pyran-2-carboxylate (0.0384 g) prepared in Example 1 is added to the flask. Five minutes after this addition, a vacuum with a slow stream of nitrogen bleeding in the system is applied over a five-minute period until the pressure is reduced to 200 mm Hg. The flask and contents are heated at 230° C. under a pressure of 200 mm Hg for 25 minutes. The metal bath temperature is increased to 270° C. At 270° C. the pressure is reduced slowly to 100 mm Hg. The flask and contents are heated at 270° C. under a pressure of 100 mm Hg for 30 minutes. The metal bath temperature is increased to 285° C. and the pressure is reduced slowly to 4.5 mm Hg. The flask and contents are heated at 285° C. under pressure of 4.5 mm Hg for 25 minutes. Then the pressure is reduced to 0.25 mm Hg and polycondensation is continued for 40 minutes. The flask is removed from the metal bath and is allowed to cool in a nitrogen atmosphere while the polymer crystallizes. The resulting polymer has an inherent viscosity of 0.58 measured in a 60/40 ratio by weight of phenol/tetrachloroethane at a concentration of 0.5 g per 100 mL. An amorphous 13.5-mil thick film molded from this polymer to simulate the sidewall of a container shows a strong absorption at 379 nm.

EXAMPLE 69

The following materials are placed in a 500-mL, three-necked, round-bottom flask:
- 97 g (0.5 mol) dimethyl terephthalate
- 62 g (1.0 mol) ethylene glycol
- 0.0087 g Ti from a n-butanol solution of acetyl-triisopropyl titanate
- 0.0192 g 2-(5-carboxy-2-benzoxazolyl)-3H-naphtho[2,1-b]pyran-2-one from Example 2

The flask is equipped with a nitrogen inlet, stirrer, vacuum outlet, and condensing flask. The flask and contents are heated at 200° C. in a metal bath for 60 minutes, at 210° C. for 75 minutes and at 230° C. for 50 minutes with a nitrogen sweep over the reaction mixture while the ester interchange takes place. The temperature of the bath is increased to 270° C. At 270° C., vacuum, with a slow stream of nitrogen bleeding in the system, is applied slowly over a 10-minute period until the pressure is reduced to 100 mm Hg. The flask and contents are heated at 270° C. under a pressure of 100 mm Hg for 30 minutes. The metal bath temperature is increased to 285° C. and the pressure is reduced slowly to 4.5 mm Hg over a 10-minute period. The flask and contents are heated at 285° C. under pressure of 4.5 mm Hg for 25 minutes. Then the pressure is reduced to 0.2 mm Hg and poly-condensation is continued at 285° C. for 16 minutes. The flask is removed from the metal bath and is allowed to cool in a nitrogen atmosphere while the polymer cyrstallizes. The resulting polymer is yellow colored and has an inherent viscosity of 0.65 measured in a 60/40 ratio by weight of phenol/tetrachloroethane at a concentration of 0.5 g per 100 mL. An ultra-violet visible spectrum of a 15-mil thick amorphous film of the polymer shows a strong absorption at 395 nm.

The inherent viscosities (I.V. of the copolyesters described herein are determined according to ASTM D2857-70 procedure in a Wagner Viscometer of Lab Glass Inc., of Vineland, New Jersey, having a ½ mL capillary bulb, using a polymer concentration of 0.5%, by weight, in 60/40, by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. is calculated from the equation:

$$\{\eta\}^{25°}_{0.50\%} = \frac{\ln \frac{t_s}{t_o}}{C}$$

where:
{η}=Inherent viscosity at 25° C. at a polymer concentration of 0.5 g/100 mL of solvent;
ln=Natural logarithm;
$t_s$=Sample flow time;
$t_o$=Solvent-blank flow time; and
C=Concentration of polymer in grams per 100 mL of solvent =0.50

The nonextractabilities of the naphthopyran residues described herein are determined as follows:

All extractions are done in glass containers with distilled solvents under the time and temperature conditions described below. The sample form is ½ inch x 2-½ inch segments cut from the cylindrical side wall portion of 2-liter bottles. All samples are washed with cold solvent to remove surface contaminants and are exposed using 200 mL solvent 100 in.² surface area (2 mL/in.²).

Solvent blanks are run under the same extraction conditions without polymer. In most cases samples were extracted, spiked, with a known amount of additive as a control, and analyzed in duplicates. The solvents employed and the extraction conditions for each solvent are:

1. Water. The samples at room temperature are added to solvent and heated at 250° F. for 2 hours. Half of the samples are then analyzed and the remainder are placed in a 120° F. oven for 30 days and then analyzed.

2. 50% Ethanol/Water. The samples at room temperature are added to the solvent at room temperature, placed in an oven at 120° F. and analyzed after 24 hours. Another set of samples is aged for 30 days at 120° F. and then analyzed.

3. Heptane. The samples at room temperature are added to solvent at room temperature and heated at 150° F. for 2 hours. Part of the samples are cooled to room temperature and analyzed spectrophotometrically and the remainder are allowed to age at 120° F. for 30 days before analysis.

Any suitable analytical technique and apparatus may be employed to determine the amount of naphthopyran residue extracted from the polymer.

The invention has been described in detail with particular reference to preferred embodiments thereof, but it will be understood that variations and modifications can be effected within the spirit and scope of the invention.

We claim:

1. A composition comprising molding or fiber-grade polyester having reacted or copolymerized therein the residue of a naphthopyran compound having the formula

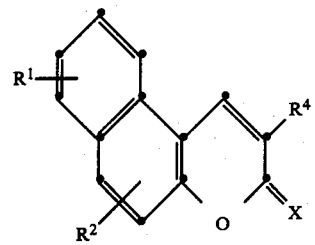

wherein
$R^1$ and $R^2$ are independently selected from hydrogen, —$R^5$, hydroxy, —O—$R^5$, halogen,

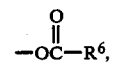

amino or

$R^4$ is cyano,

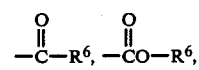

carbamoyl,

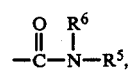

—$SO_2$—$R^6$, or an unsubstituted or substituted carbocyclic or heterocyclic or homocyclic aryl radical; and
X is oxo or imino; wherein
$R^5$ is alkenyl or an unsubstituted or substituted alkyl, cycloalkyl or aryl radical;
$R^6$ is hydrogen or an alkyl, cycloalkyl or aryl radical; and

collectively are a group having the structure

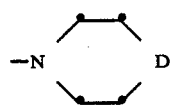

wherein D is —$CH_2$—, —O—, —S—, —$SO_2$—, —N($R^5$)—,

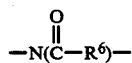

or —N($SO_2$—$R^6$)—; provided the naphthopyran compound bears at least one substituent that is reactive with one of the monomers from which the polyester polymer is derived, said naphthopyran residue absorbing radiation in the range of about 350 to 450 nm and being non-extractable from said polymer and stable under the polymer processing conditions.

2. A composition according to claim 1 wherein the amount of naphthopyran residue present is from about 10 to 100,000 ppm.

3. A composition according to claim 1 wherein the amount of naphthopyran residue present is from about 50 to 1500 ppm.

4. A composition comprising molding or fiber grade linear polyester having copolymerized therein or reacted therewith about 200 to 800 ppm of the residue of a naphthopyran compound having the formula

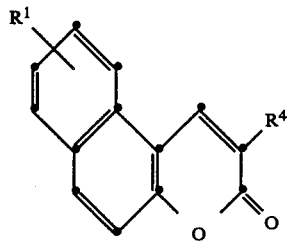

wherein
R¹ is hydrogen, hydroxy, hydroxyalkoxy, alkanoyloxyalkoxy, alkoxycarbonylalkoxy, alkoxycarbonylphenylalkoxy, N,N-bis-(hydroxyalkyl)amino, N-alkyl-N-alkanoyloxyalkylamino, N-aryl-N-hydroxyalkylamino, N-alkyl-N-hydroxyalkylamino, N-aryl-N-alkanoyloxyalkylamino, or N,N-bis(alkanoyloxyalkyl)-amino; and N,N-bis(alkanoyloxyalkyl)amino, N-alkyl-N-carboxyalkylamino, N,N-bis(carboxylalkyl)amino, N-alkyl-N-alkoxycarbonylalkylamino, N,N-bis(alkoxycarbonylalkyl)amino, N-alkyl-N-alkoxycarbonylbenzylamino, N,N-bis(alkoxycarbonylbenzyl)amino, N-alkyl-N-carboxybenzylamino or N,N-bis(carboxybenzyl)amino; and R⁴ is alkoxycarbonyl, arylsulfonyl, cyano, 2-benzoxazolyl, carboxy-2-benzoxazolyl, alkoxycarbonyl-2-benzoxazolyl, 2-benzothiazolyl, carboxy-2-benzothiazolyl, alkoxycarbonyl-2-benzothiazolyl, 2-benzimidazolyl, carboxy-2-benzimidazolyl or alkoxycarbonyl-2-benzimidazolyl;

wherein each alkyl group and alkyl moiety contains up to 6 carbon atoms and each aryl group is phenyl or phenyl substituted with alkyl of up to 4 carbon atoms or halogen; provided the naphthopyran compound bears at least one substituent that is reactive with one of the monomers from which the polyester polymer is derived, said naphthopyran residue absorbing radiation in the range of about 350 to 450 nm and being non-extractable from said polymer and stable under the polymer processing conditions.

5. A composition according to claim 4 wherein R¹ is hydrogen and R⁴ is lower alkoxycarbonyl.

6. A composition according to claim 1 wherein the polyester is comprised of at least 50 mol percent terephthalic acid residue and the glycol residue is comprised of at least 50 mol percent ethylene glycol or 1,4-cyclohexanedimethanol and the polyester contains from about 50 to 1500 ppm of the naphthopyran residue.

7. A composition according to claim 1 wherein the polyester is comprised of from about 75 to 100 mol percent terephthalic acid residue and from about 75 to 100 mol percent ethylene glycol residues and the polyester contains from about 200 to 800 ppm of the naphthopyran residue.

8. A formed article of the composition of claim 4.

* * * * *